United States Patent [19] [11] Patent Number: 4,557,459
Lindsay [45] Date of Patent: Dec. 10, 1985

[54] LOAD COUNTERBALANCING MECHANISMS

[75] Inventor: Richard A. Lindsay, Stowmarket, England

[73] Assignee: W. Vinten Limited, Bury St. Edmunds, England

[21] Appl. No.: 396,273

[22] Filed: Jul. 8, 1982

[30] Foreign Application Priority Data

Jul. 22, 1981 [GB] United Kingdom ................ 8122509

[51] Int. Cl.4 ........................................... F16M 13/00
[52] U.S. Cl. ..................................... 248/571; 248/576
[58] Field of Search .............. 248/571, 567, 576, 577, 248/578, 584, 594; 267/20 R, 20 A, 20 C, 166, 174

[56] References Cited

U.S. PATENT DOCUMENTS

| 626,873 | 6/1899 | Senderling | 267/20 R |
| 887,117 | 5/1908 | Parfrey | 267/20 R |
| 1,873,054 | 8/1932 | Sheldrick | 248/577 |
| 2,467,478 | 4/1949 | Hollingsworth | 267/20 R |
| 2,596,209 | 5/1952 | Chausson | 267/20 R |
| 3,179,364 | 4/1965 | Jackson et al. | 248/571 |
| 4,387,876 | 6/1983 | Nathan | 248/571 |

Primary Examiner—Ramon S. Britts
Assistant Examiner—Ramon O. Ramirez
Attorney, Agent, or Firm—Larson and Taylor

[57] ABSTRACT

A load counterbalancing mechanism wherein the mechanically actuated interaction of two independent spring systems, one of which is adjustable, provides the necessary counterbalancing forces to balance the torque forces set up by a load being raised, lowered or tilted about a point on which it is pivoted. Various loads are therefore accommodated by the adjustable spring system.

10 Claims, 5 Drawing Figures

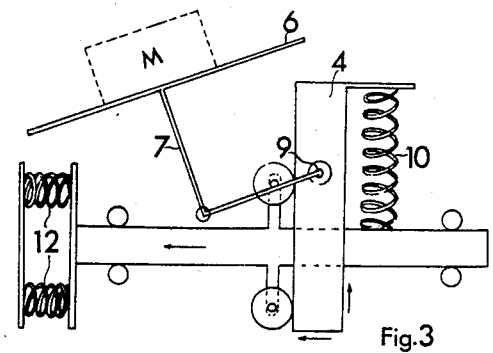
Fig. 3
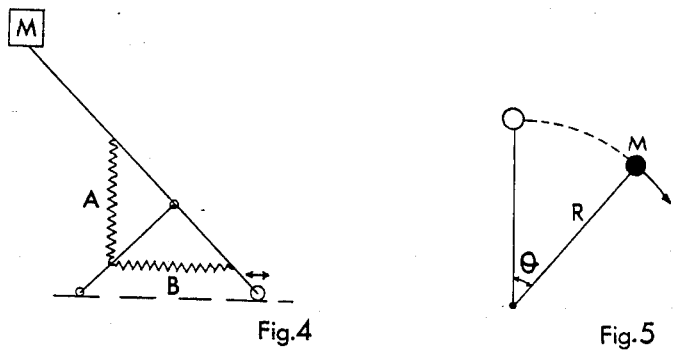
Fig. 4
Fig. 5

LOAD COUNTERBALANCING MECHANISMS

This invention relates to load counterbalancing mechanisms and more particularly, though not exclusively, to tilt mounting heads for counterbalancing the torque caused by the out of balance mass of a camera or the like mounted thereon when rotated about the tilt axis.

Many load counterbalancing mechanisms are known e.g. hydraulic or pneumatic pressure operating on pistons, spring pressures operating sinusoidally or linearly either direct or via cams. However, most of these methods are a compromise and true balance is not normally achieved without the addition of balancing weights or some other such means at the extremities of the range of balance required. Furthermore adjustment of the system to accommodate different balance loads often necessitates changes of springs or loss of true balance.

It is therefore proposed to provide a means whereby the balance of mass against gravity on such as tiltable mountings, cranes, lifting devices, balanced pedestals, adjustably balanced chairs, lamps, etc. may be easily achieved and may be simply adjusted to accommodate different balance loads.

According to the invention we provide load counterbalancing means comprising compression means for varying the length of a first spring system which is operable on a means for compressing a second spring system and a pivoted arm between a load bearing platform and said means for varying said first spring system, wherein the length of said first spring system is varied proportionally to the sine of angular movement of said pivoted arm from neutral and said second spring system compresses in accordance with a constant minus an amount proportional to the cosine of the angular movement of said arm from neutral and wherein said first and second spring systems are independent, but operate in conjunction with each other due to the combined mechanism of said compression means for varying the length of said first spring system and said means for compressing said second spring system.

The invention will now be described, by way of example only, in conjunction with the accompanying illustrations in which, FIG. 1 shows diagramatically the invention applied to a tilt mounting head at rest.

FIG. 3 shows diagramatically the action as the tilt mounting head is tilted counter-clockwise.

FIG. 4 shows the invention applied to a crane, and

FIG. 5 shows the theoretical problem.

Figure 1:
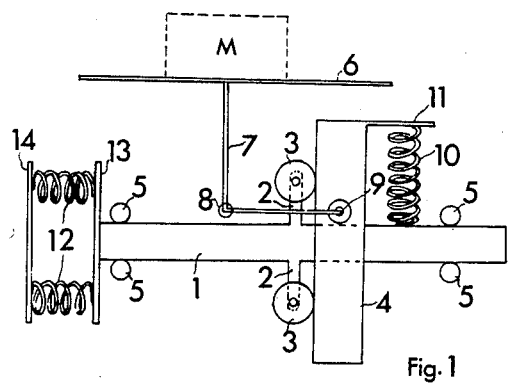

Referring to FIG. 1 a mechanism generally known as a Scotch Yoke comprises a beam 1 having cross members 2 to which rollers 3 are pivotally located. The beam 1 extends across a block 4 upon which the rollers 3 rest. Four vertically fixed locating rollers 5 prevent the beam 1 from lateral vertical movement but allow the beam free longitudinal movement. A platform 6 is mounted on a right angled arm 7 and pivoted at 8 fixed point. Platform 6 is used for mounting a television camera or the like. The opposite end of the arm 7 to the platform 6 is pivotally attached to the block 4 at pivot point 9. A spring or plurality of springs 10 located between a bracket 11 on the block 4 and the beam 1, have a displacement (i.e. variation in length) proportional to the sine of the angular movement of the arm 7 from neutral and is relaxed with the platform level. The neutral position, in this instance platform level, is when the mast M is vertically above the pivot point 8. A further spring, or plurality of springs, 12 is located between a plate 13 on the end of beam 1 and an adjustable stop plate 14 so that the compression of spring, or springs, 12 may be adjusted. Spring 12 has a displacement of an adjustable constant minus an amount proportional to the cosine of the angular movement of arm 7 from neutral.

Figure 2:
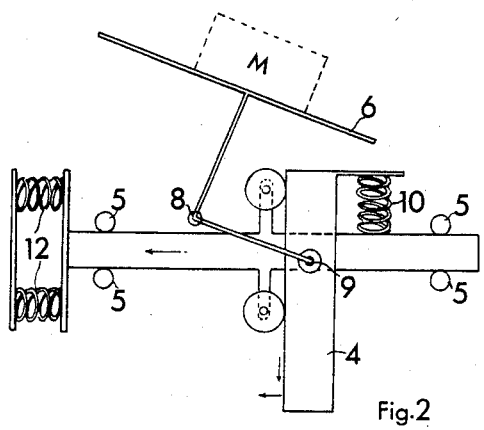
FIG. 2 shows diagramatically the action as the tilt mounting head is tilted clockwise.

Referring now to FIG. 2 wherein the platform 6 is rotated clockwise, tilted about pivot point 8, block 4 is pushed downwards by virtue of the force acting on pivot 9 and therefore moved to the left, as shown by the arrow, from its original position. This movement compresses spring 10 and at the same time, due to the action of the rollers 3, the beam 1 is forced to the left between the locating rollers 5 to compress the spring or springs 12 against adjustable stop plate 14. Were a specific spring 12 chosen then the energy stored in springs 10 and 12 would counterbalance the displaced mass of the camera or the like mounted on platform 6. To facilitate various loads on platform 6, an initial displacement (the constant) may be applied to spring, or springs, 12 by compressing spring, or springs, 12 using the adjuster (not shown) for plate 14.

Referring now to FIG. 3 wherein the platform 6 is rotated counterclockwise, the arm 7 again moves pivot point 9 to the left and hence the block 4 thereby compressing spring, or springs, 12 but it also raises block 4 thereby putting spring 10 under tension. However, as spring 10 is displaced proportinally to the sine of the angular movement of arm 7, then equal amounts of energy are stored in the spring for equal deflection of arm 7 about the neutral.

Various methods of obtaining the required sinusoidal spring displacement may be used e.g., swashplates which will vary the compression and/or tension of the springs as the platform rotates about the pivot point. Eccentrics or cams may equally well be used dependent on application and general geometry of the mechanism. In fact, any method of obtaining two independent simple harmonic motion devices can be used. An example of a mechanism which produces the required spring displacement is shown in FIG. 4.

Referring to FIG. 5 the following theories apply.

As the platform, or mass M tilts, the loss of potential energy equals $$MgR(1 - \cos\theta) \quad (1)$$

and this energy must be stored by the springs to obtain balance.

If we consider two springs deflected independently such that:

For spring A

Deflection $\partial_A = (x - a\cos\theta)$ (where 'x' is the initial static displacement of the spring and 'a' is the amplitude of the cosine term).

Then the energy stored in spring A as $\theta$ increases from 0 is $$E_A = \tfrac{1}{2} K_A(\delta_A{}^2 - x^2) \text{ where } K_A \text{ is the rate of spring } A = \quad (2)$$

$$(a^2 \cos^2\theta - 2ax\cos\theta)\frac{K_A}{2}$$

For spring B

Deflection $\partial_B = b\sin\theta$

Energy stored as $\theta$ increases from 0 is $$E_B = b^2\sin^2\theta \frac{K_B}{2} \quad (3)$$

Thus the total energy stored in the spring is $$E_T = E_A + E_B = \frac{K_A a^2 \cos^2\theta + K_B b^2 \sin^2\theta}{2} - ax K_A \cos\theta \quad (4)$$

If we make $K_A a^2 = K_B b^2$, then $$E_T = \frac{K_A a^2}{2} - K_A ax \cos\theta$$

$$= \left(\frac{K_A a^2}{2} - K_A ax\right) + \{K_A ax(1 - \cos\theta)\}$$

Constant term     Balance Term (Compare with (1))
For Balance, $MgR = K_A ax$

The amplitude of the balance term varies with x (the initial displacement of spring A) and can therefore be simply varied by changing the initial adjustment of spring A i.e. the spring operating according to a displacement equal to the constant minus the cosine of angle. In this way different balance loads may be accommodated by a steplessly variable adjustment without loss of the true balance relationship.

It will be obvious to those skilled in the art that the system described may be used in many applications as previously stated. FIG. 4 shows the system in use in a crane where only a minimal force is required to raise or lower the mass M which is counterbalanced by the interaction of the two spring systems A and B. By adjusting the displacement of spring A a wide range of loads may be accommodated and fully counterbalanced.

I claim as my invention:

1. A torque counterbalancing device comprising:
   a first spring system having a neutral position which exerts a force in a first direction which force varies in accordance with a variation in length of said first spring system;
   a second spring system which exerts a force in a second direction which force varies in accordance with a variation in length of said second spring system; and
   a varying means for varying the length of said first spring system and said second spring system in unison, said varying means including
   (a) a load bearing platform on which the load to be counterbalanced is located,
   (b) a pivot arm attached to said load bearing platform and pivoted about a predetermined point along the length thereof,
   (c) a first actuating means to which said pivot arm is connected for varying the length of said first spring system in proportion to the sine of the angular movement of said pivot arm, and
   (d) a second actuating means to which said first actuating means is connected for varying the length of said second spring system in proportion to the cosine of the angular movement of said pivot arm,
   whereby said first spring system and said second spring counterbalance the torquing load on said load bearing platform as said varying means varies said first and said second springs systems in unison.

2. A load counterbalancing means as claimed in claim 1 wherein the pivot point of said pivot arm is fixedly located between said load bearing platform and said first spring system, and wherein the movement of said load bearing platform on said pivot arm is an angular tilting movement.

3. A load counterbalancing means as claimed in claim 2 wherein said first actuating means is a block means to which said pivot arm is connected for converting angular movement of said load bearing platform into a linear force exerted on said first spring system; and wherein said second actuating means is a beam means which is operably connected to said block means for converting angular movement of said load bearing platform into a compressive linear force on said second spring system such that the linear forces exerted on said first spring system and said second spring system are equal and opposed to the forces exerted by said load bearing platform as said platform tilts.

4. A load counterbalancing means as claimed in claim 3 wherein said second spring system is initially compressed by an adjusted amount necessary to accommodate the range of resulting forces required to couterbalance the load on said load bearing platform.

5. A load counterbalancing means as claimed in claim 4 wherein said block means and said beam means have respective movement axes which are at right angles to one another; and wherein said block means includes a block and a rollers means which is attached to said beam means for guiding said block along said respective movement axis to cause compression or tension in said first spring system and for transmitting movement of said pivot arm and said block to said beam means to cause compression of said second spring system.

6. A load counterbalancing means as claimed in claim 5 wherein said beam means includes a beam and rollers means for guiding said beam along said respective movement axis.

7. A load counterbalancing means as claimed in claim 4 wherein said second spring system includes a beam plate affixed to said beam, an adjustable stop plate which is adjustable relative to said beam plate, and a spring means located between said beam plate and said adjustable stop plate such that the initial compression force exerted by said spring means on said beam is adjusted by adjusting said adjustable stop plate relative to said beam plate.

8. A load counterbalancing means as claimed in claim 1 wherein said load bearing platform is vertically adjustable to control the elevation of a load thereon.

9. A load counterbalancing means as claimed in claim 8 wherein said varying means further includes a pivot arm support which is pivotally attached to said pivot arm at a point along the length thereof; wherein said first spring system is located between said pivot arm and said pivot arm support on one side of said pivot arm support; and wherein said second spring system is located in compression between said pivot arm and said pivot arm support on the other side of said pivot arm support such that a load supported at one extremity of said pivot arm is counteracted by the combined effect of the compression and tension of said first spring system and the compression of said second spring system.

10. A load counterbalancing means as claimed in claim 9 wherein said second spring system is initially compressed by an adjusted amount necessary to accommodate the range of resulting forces required to counterbalance the load on said load bearing platform.

* * * * *